(12) United States Patent  
Azimi et al.

(10) Patent No.: US 7,057,791 B2  
(45) Date of Patent: Jun. 6, 2006

(54) COMPACT MULTIPASS OPTICAL ISOLATOR

(75) Inventors: Masud Azimi, Belmont, MA (US); Daryoosh Vakhshoori, Cambridge, MA (US); Kevin J. Knopp, Newburyport, MA (US); Gregory Vander Rhodes, Melrose, MA (US); Peidong Wang, Carlisle, MA (US)

(73) Assignee: Ahura Corporation, Wilmington, MA (US)

( * ) Notice: Subject to any disclaimer, the term of this patent is extended or adjusted under 35 U.S.C. 154(b) by 0 days.

(21) Appl. No.: 10/802,069

(22) Filed: Mar. 15, 2004

(65) Prior Publication Data

US 2004/0240031 A1    Dec. 2, 2004

Related U.S. Application Data

(60) Provisional application No. 60/454,223, filed on Mar. 13, 2003.

(51) Int. Cl.  
*G02F 1/09* (2006.01)
(52) U.S. Cl. ..................... 359/280; 359/281
(58) Field of Classification Search .......... 359/280, 359/281, 282, 283, 284, 484; 398/183, 152, 398/205; 372/27, 37; 385/6  
See application file for complete search history.

(56) References Cited

U.S. PATENT DOCUMENTS 5,657,151 A * 8/1997 Swan et al. ............ 359/281

* cited by examiner

*Primary Examiner*—Scott J. Sugarman  
*Assistant Examiner*—Richard Hanig  
(74) *Attorney, Agent, or Firm*—Pandiscio & Pandiscio (57) ABSTRACT

An optical isolator is disclosed for transmitting light in a first direction and blocking light in a second direction along an optical pathway. The optical isolator includes an input polarizer having a pass axis at first angle, an output polarizer having a pass axis at second angle, a Faraday rotator material between the polarizers having a Verdet constant and an axis of maximum length therethrough, generation means for generating a magnetic field around and inside the rotator material, and at least one reflector configured to define an optical length through the rotator material which is longer than the axis therethrough. The optical pathway length through the rotator material, the magnetic field strength, and the Verdet constant are selected so as to rotate light through the Faraday rotator material from the first angle to the second angle.

29 Claims, 7 Drawing Sheets

COMPACT MULTIPASS OPTICAL ISOLATOR

REFERENCE TO PENDING PRIOR PATENT APPLICATION

This patent application claims benefit of pending prior U.S. Provisional Patent Application Ser. No. 60/454,223, filed Mar. 13, 2003 by Kevin Knopp et al. for COMPACT MULTIPASS OPTICAL ISOLATOR, which patent application is hereby incorporated herein by reference.

FIELD OF THE INVENTION

This invention is related to free space optics and fiber optic applications apparatus and methods in general, and more particularly to apparatus and methods for optical isolation of light.

BACKGROUND OF THE INVENTION

Figure 1:
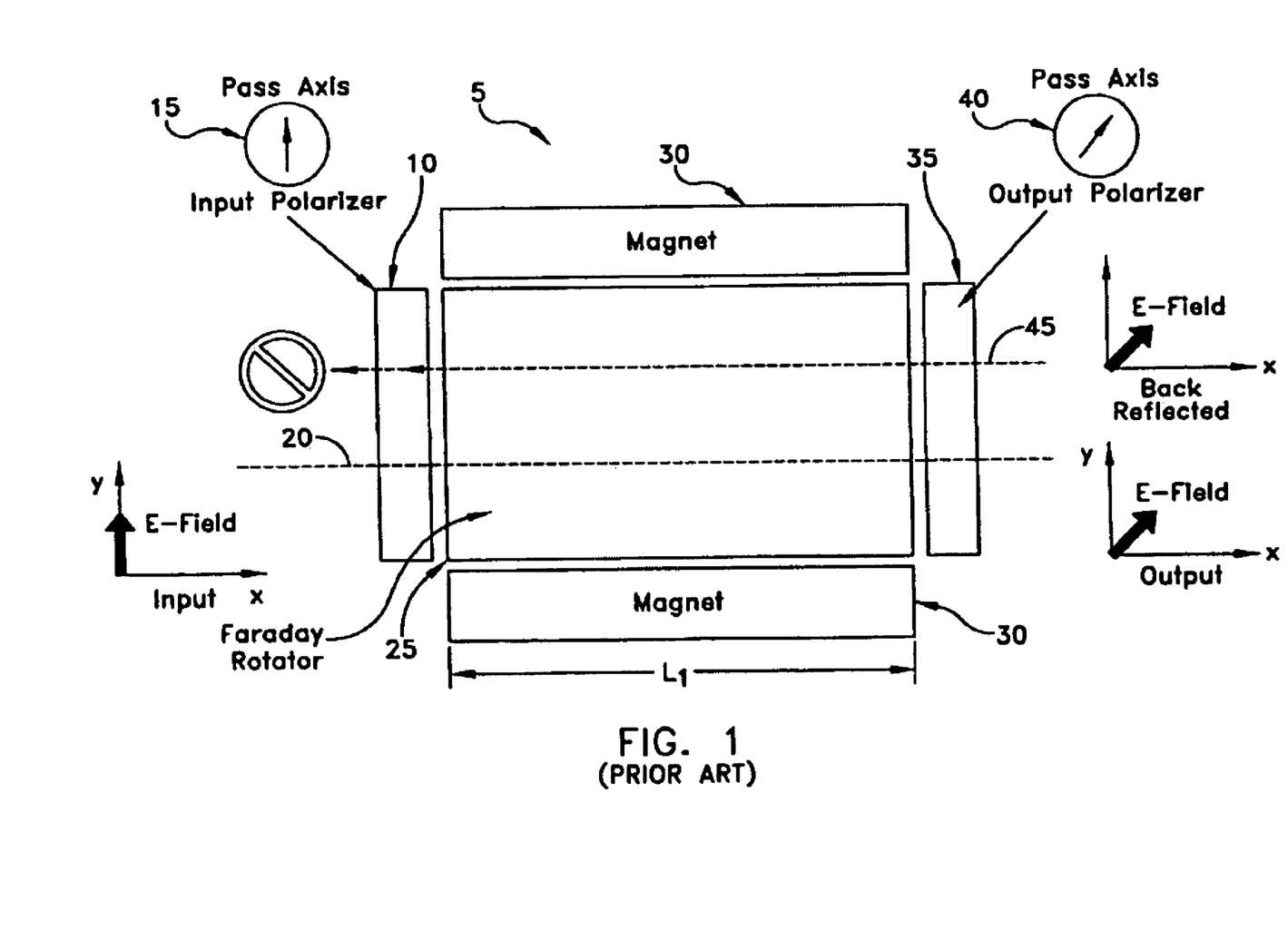
FIG. 1 is a schematic diagram of one configuration of a conventional optical isolator.

Optical isolators are key elements required in most free space optic and fiber optic applications. The most commonly used type of isolator is based around a Faraday rotator crystal. FIG. 1 is a schematic diagram that illustrates a typical configuration of a conventional optical isolator 5. An input polarizer 10 of isolator 5 is typically aligned to a linear polarization angle 15 of input light 20. A crystal 25 of a given length $L_1$ which is immersed in a magnetic field generated by a pair of magnets 30, which rotates the polarization state of the launched light 20 via the Faraday effect to an angle of 45°. An exit polarizer 35 is then aligned to a non-parallel polarization angle 40 so as to transmit this polarization state at the angle of 45° and pass light 20. Light 45, which has exited isolator 5 that may be reflected back into isolator 5, passes through the exit polarizer 35 experiences an additional rotation of polarization of 45° The polarization state of light 45 is then orthogonal to input polarizer angle 15 at the entrance plane to isolator 10. Optical isolation is thereby achieved in an optical system before and after isolator 5.

In many applications, the size of an optical isolator assembly is extremely important. The size has traditionally been limited by the Verdet constant of the isolator's Faraday material. In shorter wavelength applications of less than 1000 nm, the Verdet constant is low for optically desirable (e.g., low optical loss) materials such as Terbium Gallium Granite (TGG). Hence, a long optical path length is needed. Isolators with physical lengths of greater than 2 cm are common for these shorter wavelength applications. Accordingly, it would be most desirable to obtain an optical isolator for shorter wavelength applications with a more compact physical size.

Figure 2:
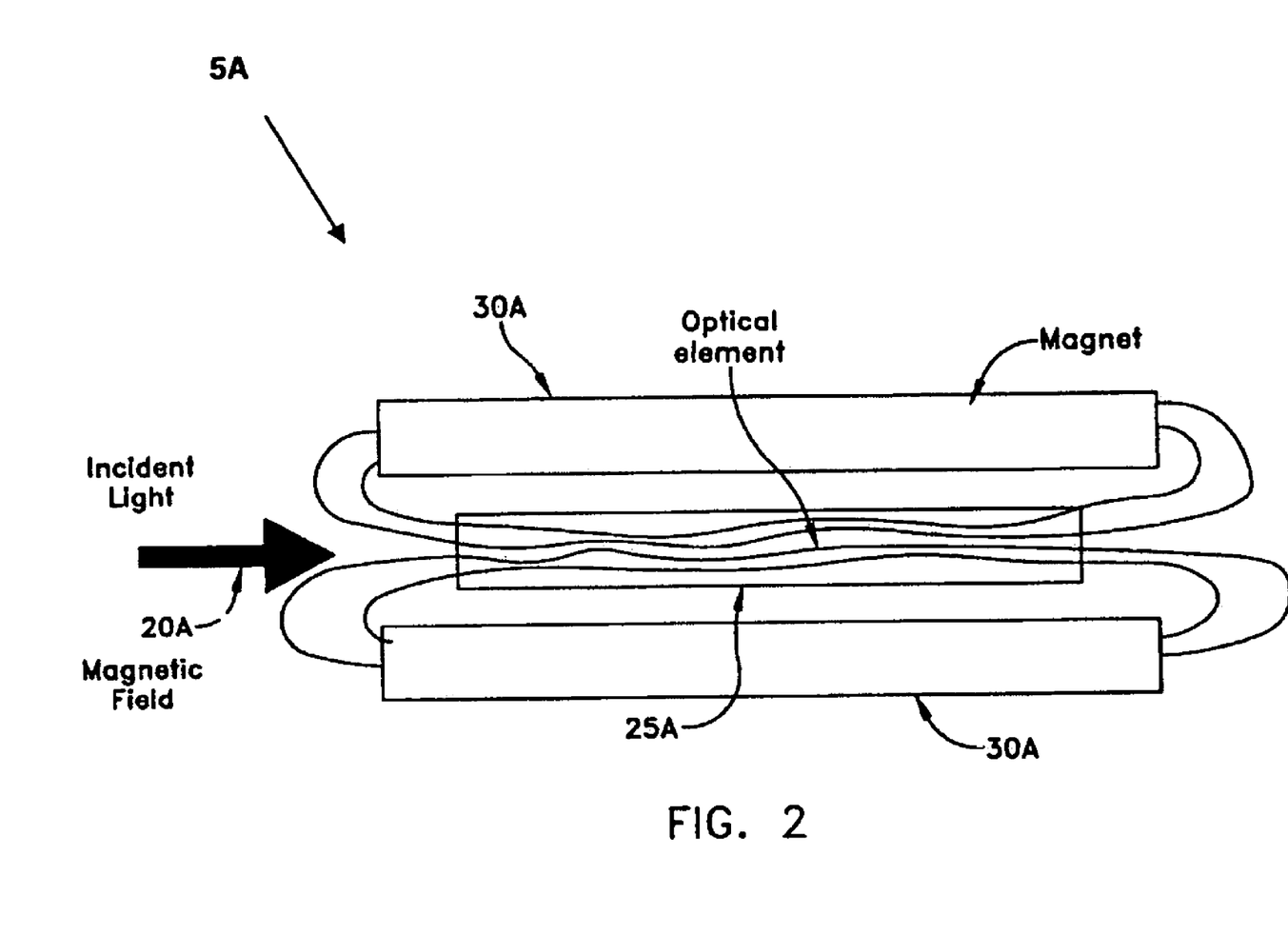
FIG. 2 is a Faraday rotator with an optical element and a magnet surrounding the optical element.

Referring to FIG. 2, there is shown an optical element 5A which can rotate plane of polarization of polarized light 20A in a non-reciprocal manner, using Faraday-effect, which is called a Faraday rotator and is an essential building block for various optical devices such as isolator, circulator, and optical switch. A Faraday rotator 5A includes an optical element 25A and a magnet 30A surrounding the optical element 25A.

The magnet is magnetized and positioned in such a way that its magnetic field is aligned with an optical axis of the optical element. As a result, plane of polarization of polarized light 20A from a source such as a laser or an optical fiber traveling along the optical axis of the element will be rotated by a desired angle θ. This rotation may be clockwise or counterclockwise and its magnitude depends on Verdet constant V of optical element, magnetic field strength (B), and length of optical element (L). This rotation is expressed as:

$$\theta = VBL$$

During past several years various materials have been identified and made which can be used as an optical element for Faraday rotation. Among them Bismuth-Iron-Garnet composition (BIG) and TGG crystal are the most widely used materials. The value of Verdet constant, normally depends on the wavelength of the incident light and temperature, thus for a given wavelength and length of crystal a specific magnetic field B is needed to achieve a desired rotation angle θ. However, for BIG material the aforementioned linear equation is valid only up to certain level of magnetic flux strength, e.g., where B<350 Oe, and eventually the rotation angle will saturate and become constant by increasing the magnetic flux density B. This is an interesting feature for devices based on BIG material. As long as the magnetic field remains above the minimum saturation field the rotation angle will not change with any disturbance to B field due to temperature or proximity to other magnetic materials. Commercial single stage optical isolators with better than 40 dB isolation, less than 0.5 dB transmission loss, and few nano-meter band-width at 1550 nm are readily available. A major draw back for BIG materials is that their window of optical transparency is limited to above 1100 nm wavelength range and in visible and Near-IR wavelength (less than 1000 nm) BIG has large optical absorption loss and is not usable.

Magneto-optic crystals such as TGG crystal show very small optical absorption over large wavelength range including visible and NIR. However, magneto-optic crystals suffer from three fundamental problems. First, magneto-optic crystals have low Verdet constant compared to BIG. For example, the Verdet constant for TGG is two orders of magnitude less than that of BIG. Second, the rotation angle of magneto-optic crystals remains linearly proportional to B field for practical values of B field. This implies that a long crystal, e.g., on the order of tens of centimeters, along with a strong magnetic field (close to 1 Tesla) is needed in order to get about a 45° polarization rotation angle. In addition, to maintain constant rotation angle over life of the device, one has to make sure that the B field will not change by aging or disturbed by external perturbations such as temperature or proximity to other magnetic materials. Third, the use of multistage isolators are required to achieve isolation better than 30 dB. Such multistage isolators add to the cost and make the size of the isolator almost impractical for most applications.

SUMMARY OF THE INVENTION

To overcome size issue the present invention uses a volume of crystal several times by reflecting the incoming light inside the crystal several times and, as a result, increases the effective interaction length by the number of bounces within crystal. For example, for a given magnetic field strength, if light bounces m times inside a TGG crystal of length L, the effective interaction length will be mL. Thus, required length will be m times shorter in order to achieve the same rotation angle.

An object of the invention is to provide a compact, low cost, and manufacturable optical isolator with a better than 40 dB isolation using magneto-optic crystals such as TGG.

Another object of the invention is to provide an optical isolator which can be implemented at any desired wavelength, particularly at 976 nm, 980 nm and 880 nm.

A further object of the invention is to provide an optical isolator which overcomes the large size, cost and sensitivity to magnetic field distortion which have been major bottlenecks for commercialization of isolators based on TGG crystals.

With the above and other objects in view, as will hereinafter appear, there is provided an optical isolator for transmitting light in a first direction along an optical pathway therethrough and blocking the light in a second direction along the optical pathway, and the first direction and the second direction being in opposition to one another, the optical isolator comprising:

an input polarizer and an output polarizer, the input polarizer having a first pass axis of a first given angle, the output polarizer having a second pass axis of a second given angle, the input polarizer configured to polarize the light entering into the optical pathway to a first given plane of polarization parallel to the first given angle;

a Faraday rotator material disposed between the input polarizer and the output polarizer, the Faraday rotator material having a given Verdet constant, a first end and a second end in opposition to one another, the first end and the second end disposed at a maximum linear distance across the Faraday rotator material from one another, and the first end and the second end defining an axis therebetween defining a maximum linear length through the Faraday rotator material;

generation means for generating a magnetic field around and inside the Faraday rotator material, the generation means providing a given magnetic field strength; and at least one reflector configured along the optical pathway from the input polarizer to the output polarizer, the at least one reflector defining a given optical length of the optical pathway through the Faraday rotator material, and the given optical length through the Faraday rotator material being longer than the maximum linear distance across the Faraday rotator material;

wherein the given length of the optical pathway through the Faraday rotator material provided by the at least one reflector, the given magnetic field strength provided by the generation means, and the Verdet constant of the Faraday rotator material are selected with respect to one another so as to rotate the light along the given length of the optical pathway through the Faraday rotator material from the first given angle of the input polarizer to the second given angle of the output polarizer.

In accordance with a further feature of the invention there is provided a method of optically isolating light by allowing transmission of the light in a first direction along an optical pathway through an optical isolator and blocking transmission of the light in a second direction along a second direction through the optical isolator, and the first direction and the second direction being in opposition to one another, the method comprising:

initially polarizing the light with an input polarizer, the light being polarized at a first given plane of polarization parallel to a first given angle;

transmitting the initially polarized light along an optical pathway through a Faraday rotator material having a magnetic field applied thereto so as to rotate the initially polarized light from the first given angle to an intermediate angle;

reflecting the polarized light to provide a given number of passes through a portion of the Faraday rotator material so as to further rotate the polarized light from the intermediate angle to a second given plane of polarization parallel to a second given angle; and passing the polarized light at the second given plane of polarization parallel to the second given angle through an output polarizer;

wherein the polarized light is reflected along the optical pathway between the input polarizer and the output polarizer so as to provide an appropriate length of the optical pathway with a reduced length of the Faraday rotator material.

In accordance with a further feature of the invention there is provided a method of optically isolating light, the method comprising:

providing an optical isolator for transmitting light in a first direction along an optical pathway therethrough and blocking the light in a second direction along the optical pathway, and the first direction and the second direction being in opposition to one another, the optical isolator comprising:

an input polarizer and an output polarizer, the input polarizer having a first pass axis of a first given angle, the output polarizer having a second pass axis of a second given angle, the input polarizer configured to polarize the light entering into the optical pathway to a first given plane of polarization parallel to the first given angle;

a Faraday rotator material disposed between the input polarizer and the output polarizer, the Faraday rotator material having a given Verdet constant, a first end and a second end in opposition to one another, the first end and the second end disposed at a maximum linear distance across the Faraday rotator material from one another, and the first end and the second end defining an axis therebetween defining a maximum linear length through the Faraday rotator material;

generation means for generating a magnetic field around and inside the Faraday rotator material, the generation means providing a given magnetic field strength; and at least one reflector configured along the optical pathway from the input polarizer to the output polarizer, the at least one reflector defining a given optical length of the optical pathway through the Faraday rotator material, and the given optical length through the Faraday rotator material being longer than the maximum linear distance across the Faraday rotator material;

wherein the given length of the optical pathway through the Faraday rotator material provided by the at least one reflector, the given magnetic field strength provided by the generation means, and the Verdet constant of the Faraday rotator material are selected with respect to one another so as to rotate the light along the given length of the optical pathway through the Faraday rotator material from the first given angle of the input polarizer to the second given angle of the output polarizer;

polarizing the light entering the input polarizer to the first given angle;

rotating the polarized light from the first given angle to the second given angle through the Faraday rotator material; and passing the polarized light from the Faraday rotator material through the output polarizer so as to prevent reflected light from transmission through the input polarizer due to a non-reciprocal rotation of the light in the second direction through the Faraday rotator material so as to allow the input polarizer to block the reflected light.

The above and other features of the invention, including various novel details of construction and combinations of parts and method steps will now be more particularly described with reference to the accompanying drawings and pointed out in the claims. It will be understood that the particular devices and method steps embodying the invention are shown by way of illustration only and not as limitations of the invention. The principles and features of this invention may be employed in various and numerous embodiments without departing from the scope of the invention.

BRIEF DESCRIPTION OF THE DRAWINGS

These and other objects and features of the present invention will be more fully disclosed or rendered obvious by the following detailed description of the preferred embodiments of the invention, which are to be considered together with the accompanying drawings wherein like numbers refer to like parts, and further wherein.

DETAILED DESCRIPTION OF THE PREFERRED EMBODIMENTS

Figure 3:
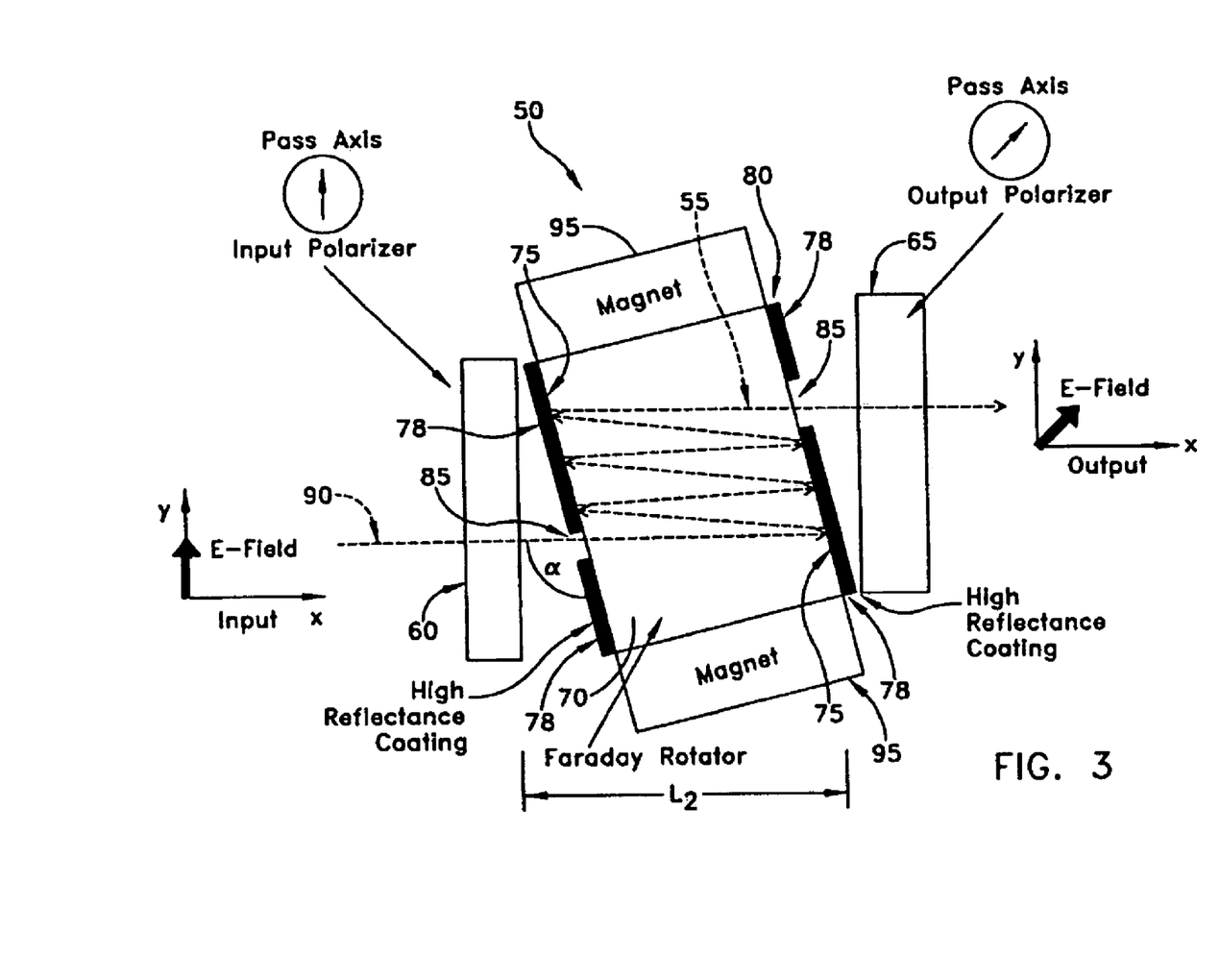
FIG. 3 is a schematic diagram illustrating a compact multipass optical isolator of a preferred embodiment of the present invention.

Referring to FIG. 3, and in a preferred embodiment of the present invention, there is shown a novel multipass optical isolator 50, which uses multiple optical passes 55 to reduce the physical size while maintaining the needed optical path length from input polarizer 60 to output polarizer 65.

Faraday rotator material 70 of optical isolator 50 has a pair of opposing facets 75 which are covered with a high reflecting coating 78 so as to form a multipass etalon 80. A small uncoated region 85 is patterned on each facet 75 to allow light 90 to enter and exit etalon 80.

Referring still to FIG. 3, and in a preferred embodiment of the present invention, the angle of incidence α of light 90 to Faraday rotator etalon 80 is selected to set the desired number of reflections off of high reflecting coating 75 which in turn allows the desired number of passes through Faraday rotator material 70. One or more magnets 95 are configured adjacent to Faraday rotator material 70 so as to generate a magnetic field. Length $L_2$ of Faraday rotator material 70 is selected in accordance with the given incident angle α, the strength of the magnetic field generated by magnets 95, the Verdet constant of Faraday rotator material 70, and the number of bounces 55, such that length $L_2$ causes the total rotation of the polarization state is 45° from input polarizer 60 to output polarizer 65. This multipass configuration of optical isolator 50 is possible because the direction of polarization state rotation obtained via the Faraday effect is set by the direction of the magnetic field as opposed to the direction of light propagation. Thus, multiple optical passes 55 through Faraday rotator material 70 amplify the rotation effect which in turn allows a reduced physical length $L_2$ of Faraday rotator material 70. Input polarizer 60 and output polarizer 65 may be directly attached to rotator material 70 as the angle dependence of the transmittance for a particular pass axis is low. Magnets 95 are preferably either permanent poled magnetics or electromagnetics. The physical orientation of the magnetic field applied by magnets 95 is governed by the physics of the Faraday effect.

Figure 4:
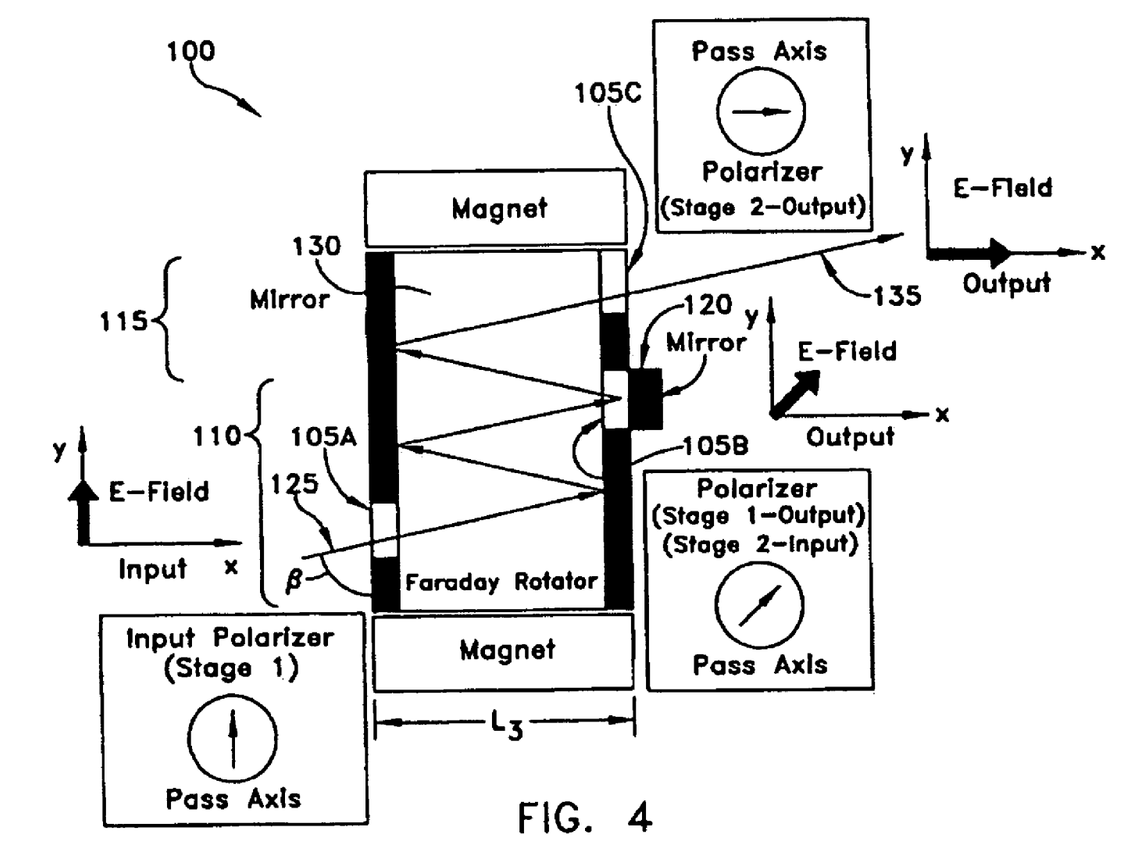
FIG. 4 is a schematic diagram illustrating an integrated multipass and multistage optical isolator of a preferred embodiment of the present invention.

Referring now to FIG. 4, and in a preferred embodiment of the present invention, there is shown an integrated multipass and multistage optical isolator 100 having a particular geometry for higher levels of optical isolation. The geometry of multistage optical isolator 100 is obtained using three or more polarizers 105. A second midstage polarizer 105B serves as the output polarizer of first stage of isolation 110 and the input polarizer to the second stage 115 of isolation. The back surface of the polarizer is coated with a high reflection coating to form a mirror 120 so as to redirect light 125 into the second stage 115. Compact isolator 100 preferably has an isolation of greater than 50 dB. The angle of incidence β of the light 125 to Faraday rotator material 130 is selected to set the desired number of reflections which in turn allows the desired number of passes through rotator 130. Length $L_3$ of Faraday rotator material 130 is selected in accordance with the given incident angle β, magnetic field, Verdet constant, and number of bounces such that the total rotation of the polarization state is 45° from the input polarizer 105A of first stage 110 to output polarizer 105B. Similarly, another rotation of 45° occurs second stage 115 to further rotate the polarization an additional 45°. Output light 135 of isolated light 125 from two stage unit is orthogonal in polarization to input light 125.

In addition to the two stage configuration as shown in FIG. 4, a preferred embodiment of the present invention comprises a multipass and multistage isolator with at least three stages assembled together in a similar manner.

Figures 5A, 5B:
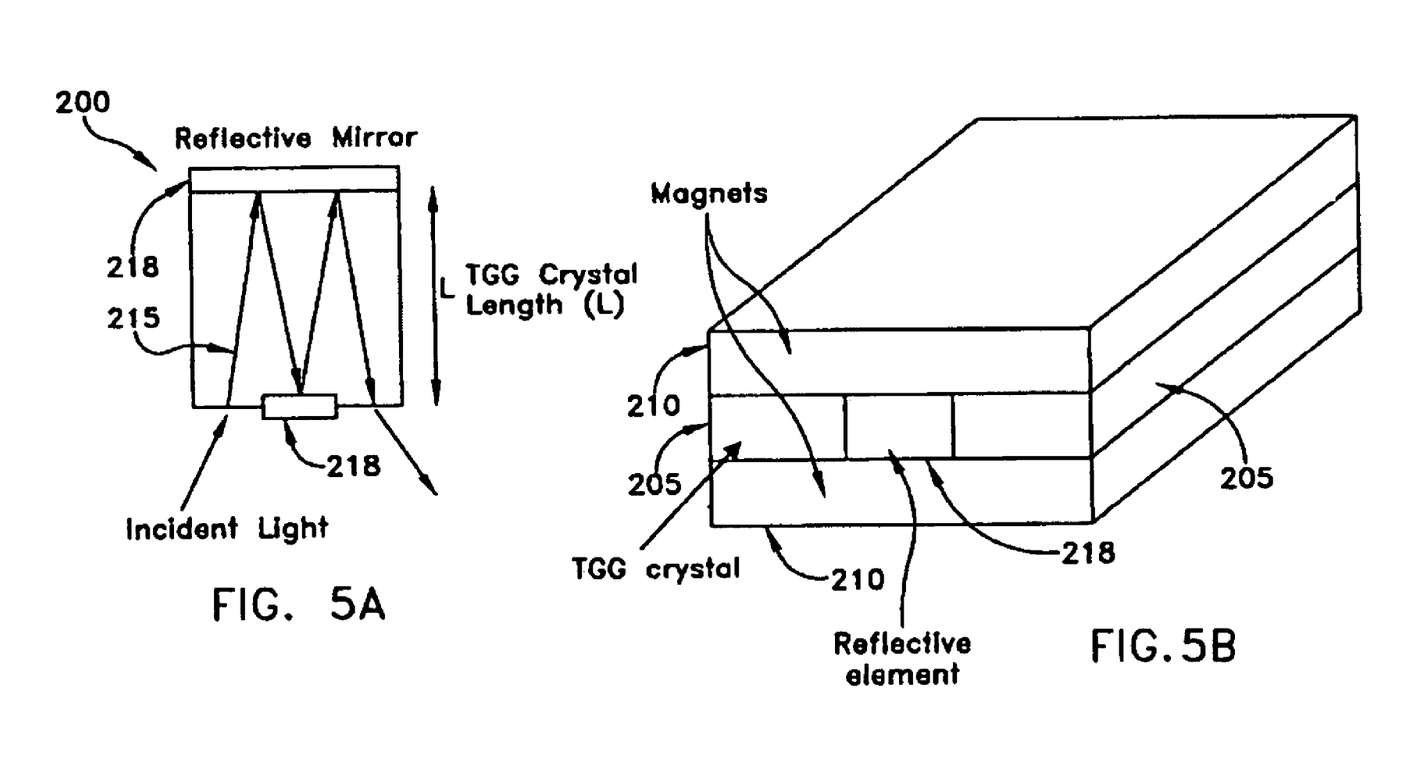
FIGS. 5A and 5B are schematic diagrams illustrating a multipass optical isolator of a preferred embodiment of the present invention.

Referring now to FIG. 5, and in a preferred embodiment of the present invention, there is shown a sandwich isolator 200 having a slab of TGG crystal 205 sandwiched between two magnet slabs 210 with proper magnetization orientation. Incident light 215 is reflected by mirrors 218 so as to travel along length L of crystal 205 several times which effectively increases the interaction length and minimizes required volume and size of TGG crystal 205 for a desired rotation angle such as 45°.

Figure 6A:
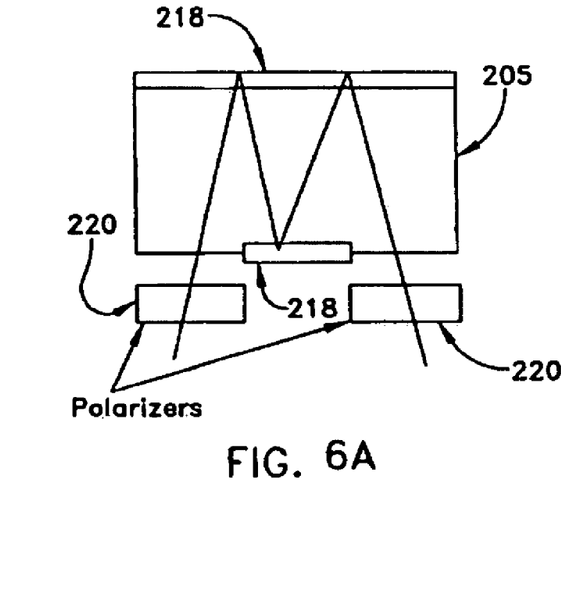
FIGS. 6A and 6B are schematic diagrams illustrating a multipass optical isolator having a single stage and a multipass isolator having a semi-double stage, respectively.
Figure 6B:
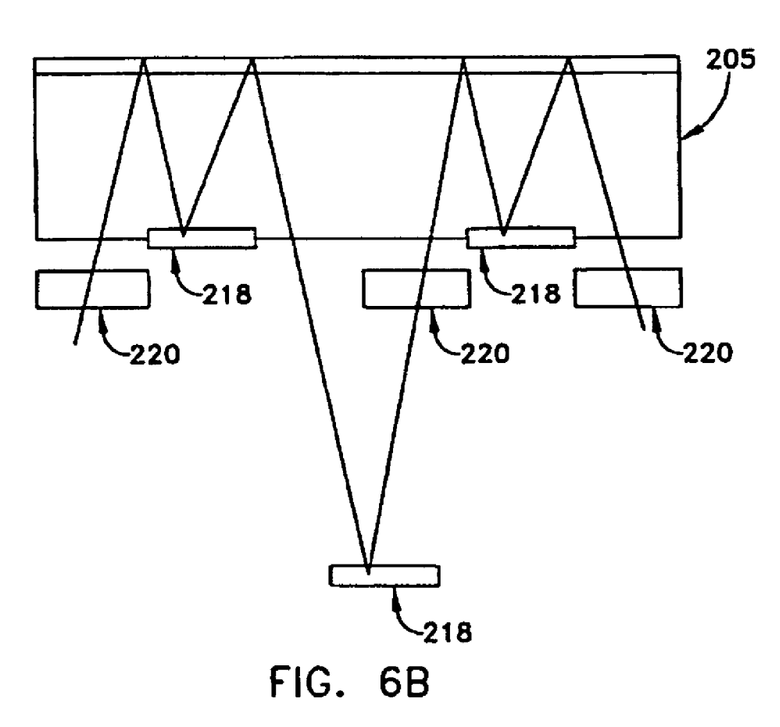

Referring now to FIGS. 6A and 6B, to build isolator 200 or a circulator based on a Faraday rotor material, it is required to add polarizers 220 at proper locations. An important parameter for an optical isolator is called extinction ratio which is a measure of achievable isolation by isolator. A single stage isolator (FIG. 6A) and a semi-double isolator (FIG. 6B) are shown based on multi-pass Faraday rotator 200.

This structure can be extended to multistage isolators by adding to width of the crystal and repeating the single stage configuration as many times as required. As it is observed this only requires extension of width of crystal without extending the length of the TGG crystal which can significantly reduce size and cost of the isolators or circulators based on this configuration.

Figure 7A:
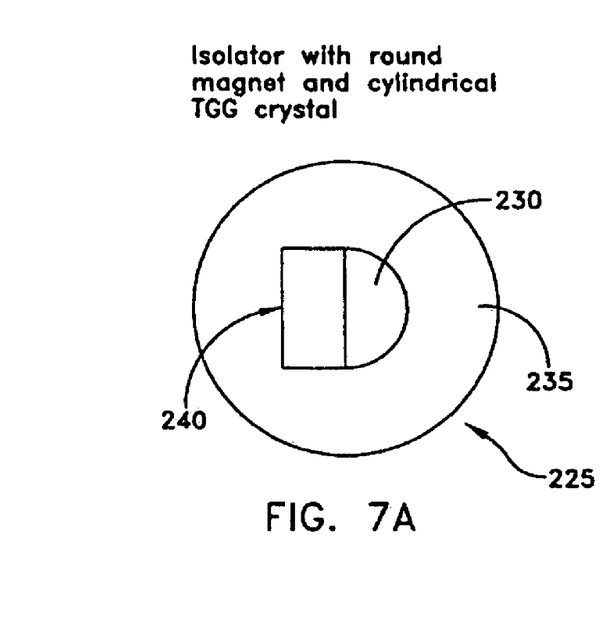
FIGS. 7A and 7B are schematic diagrams illustrating a multipass isolator having a cylindrical Faraday rotator material and a magnet surrounding the cylindrical Faraday rotator material.
Figure 7B:
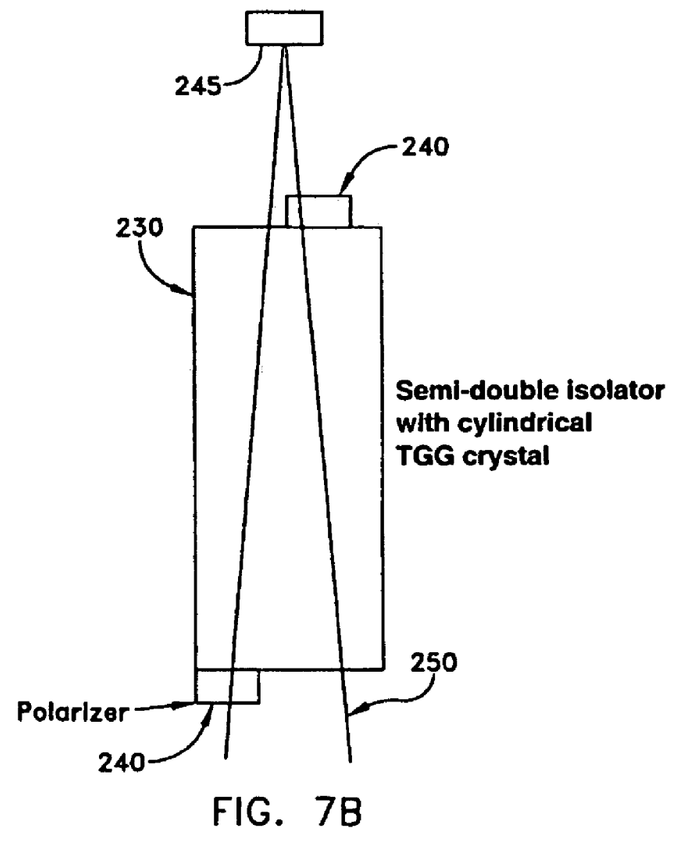

Referring now to FIGS. 7A and 7B, and in a preferred embodiment of the present invention, there is shown a semi-double isolator 225 having an isolation of over 70 dB. In practice, a slab of TGG crystal which is sandwiched between two slab of magnets cannot produce large extinction ratio mainly due to residual stress at sharp corners of slab TGG crystal and non uniformity of field generated from slab magnets. Therefore, it is difficult to fabricate an isolator with large isolation, i.e., close to 40 dB for single stage, using slab magnets and slab TGG crystal geometry. To overcome this issue, semi-double isolator 225 is modified from the slab configuration to replace slab TGG crystal with cylindrical rod 230 and replace slab magnets with a piped-shaped magnet 235. Polarizers 240 and a reflector 245 are configured relative to cylindrical rod and piped-shaped magnet 235 for directing light 250 therethrough.

What is claimed is:

1. An optical isolator for transmitting light in a first direction along an optical pathway therethrough and blocking the light in a second direction along the optical pathway, and the first direction and the second direction being in opposition to one another, the optical isolator comprising:
    an input polarizer and an output polarizer, the input polarizer having a first pass axis of a first given angle, the output polarizer having a second pass axis of a second given angle, the input polarizer configured to polarize the light entering into the optical pathway to a first given plane of polarization parallel to the first given angle;
    a Faraday rotator material disposed between the input polarizer and the output polarizer, the Faraday rotator material having a given Verdet constant, a first end and a second end in opposition to one another, the first end and the second end disposed at a maximum linear distance across the Faraday rotator material from one another, and the first end and the second end defining an axis therebetween defining a maximum linear length through the Faraday rotator material;
    generation means for generating a magnetic field around and inside the Faraday rotator material, the generation means providing a given magnetic field strength; and
    at least one reflector configured along the optical pathway from the input polarizer to the output polarizer, the at least one reflector defining a given optical length of the optical pathway through the Faraday rotator material, and the given optical length through the Faraday rotator material being longer than the maximum linear distance across the Faraday rotator material;
    wherein the given length of the optical pathway through the Faraday rotator material provided by the at least one reflector, the given magnetic field strength provided by the generation means, and the Verdet constant of the Faraday rotator material are selected with respect to one another so as to rotate the light along the given length of the optical pathway through the Faraday rotator material from the first given angle of the input polarizer to the second given angle of the output polarizer.

2. An optical isolator according to claim 1 wherein the difference between the first given angle and the second given angle is 45°.

3. An optical isolator according to claim 1 wherein the Faraday rotator material comprises magneto-optic crystal.

4. An optical isolator according to claim 3 wherein the magneto-optic crystal is Terbium Gallium Granite (TGG) crystal.

5. An optical isolator according to claim 1 wherein the light isolated by the Faraday rotator material has a wavelength of under 1000 nm.

6. An optical isolator according to claim 5 wherein the wavelength of the light is 976 nm.

7. An optical isolator according to claim 5 wherein the wavelength of the light is 980 nm.

8. An optical isolator according to claim 5 wherein the wavelength of the light is 880 nm.

9. An optical isolator according to claim 1 wherein the given optical length of the optical pathway through the Faraday rotator material is at least twice the maximum linear distance across the Faraday rotator material.

10. An optical isolator according to claim 1 wherein the generation means comprise at least one magnet.

11. An optical isolator according to claim 10 wherein the at least one magnet is round and is configured to surround at least a portion of the Faraday rotator material.

12. An optical isolator according to claim 10 wherein the at least one magnet is a pair of bar magnets disposed adjacent to and on opposing sides of the Faraday rotator material.

13. An optical isolator according to claim 10 wherein the at least one magnet is a permanent poled magnet.

14. An optical isolator according to claim 10 wherein the at least one magnet is an electromagnet.

15. An optical isolator according to claim 1 wherein the at least one reflector comprises a highly reflective coating disposed on the Faraday rotator material.

16. An optical isolator according to claim 15 wherein the highly reflective coating is disposed on a first facet and a second facet of the Faraday rotator material so as to form a multipass etalon.

17. An optical isolator according to claim 16 wherein the Faraday rotator material comprises an uncoated region on each of the first facet and the second facet, respectively, so as to allow light to enter and exit the multipass etalon.

18. An optical isolator according to claim 1 wherein the at least one reflector comprises a highly reflective mirror.

19. An optical isolator according to claim 18 wherein the highly reflective mirror is disposed adjacent to the Faraday rotator material.

20. An optical isolator according to claim 19 wherein the highly reflective mirror is disposed a given distance from the Faraday rotator material.

21. An optical isolator according to claim 1 further comprising selection means for selecting a given angle of incidence of the light disposed on the input polarizer, the selection means configured to select the optical pathway through the Faraday rotator material.

22. An optical isolator according to claim 21 wherein the selection means provide an adjusted length of the optical pathway from the given length of the optical pathway.

23. An optical isolator according to claim 22 wherein the adjusted length of the optical pathway comprises a chosen number of reflections through the Faraday rotator material.

24. An optical isolator according to claim 23 wherein the chosen number of reflections through the optical pathway for the adjusted length are equal to a given number of reflections through the optical pathway for the given length of the optical pathway.

25. An optical isolator according to claim 23 wherein the chosen number of reflections through the optical pathway for the adjusted length are greater than a given number of reflections through he optical pathway for the given length of the optical pathway.

26. An optical isolator according to claim 1 wherein the light blocked in the second direction has an isolation of greater than 50dB.

27. An optical isolator according to claim 1 further comprising at least one additional polarizer disposed in the optical pathway between the input polarizer and the output polarizer.

28. An optical isolator according to claim 27 wherein the at least one additional polarizer comprises at least one additional reflector configured to redirect the optical pathway.

29. A method of optically isolating light, the method comprising:
   providing an optical isolator for transmitting light in a first direction along an optical pathway therethrough and blocking the light in a second direction along the optical pathway, and the first direction and the second direction being in opposition to one another, the optical isolator comprising:
      an input polarizer and an output polarizer, the input polarizer having a first pass axis of a first given angle, the output polarizer having a second pass axis of a second given angle, the input polarizer configured to polarize the light entering into the optical pathway to a first given plane of polarization parallel to the first given angle;
      a Faraday rotator material disposed between the input polarizer and the output polarizer, the Faraday rotator material having a given Verdet constant, a first end and a second end in opposition to one another, the first end and the second end disposed at a maximum linear distance across the Faraday rotator material from one another, and the first end and the second end defining an axis therebetween defining a maximum linear length through the Faraday rotator material;
      generation means for generating a magnetic field around the Faraday rotator material, the generation means providing a given magnetic field strength; and
      at least one reflector configured along the optical pathway from the input polarizer to the ouput polarizer, the at least one reflector defining a given optical length of the optical pathway through the Faraday rotator material, and the given optical length through the Faraday rotator material being longer than the maximum linear distance across the Faraday rotator material;
      wherein the given length of the optical pathway through the Faraday rotator material provided by the at least one reflector, the given magnetic field strength provided by the generation means, and the Verdet constant of the Faraday rotator material are selected with respect to one another so as to rotate the light along the given length of the optical pathway through the Faraday rotator material from the first given angle of the input polarizer to the second given angle of the output polarizer;
   polarizing the light entering the input polarizer to the first given angle;
   rotating the polarized light from the first given angle to the second given angle through the Faraday rotator material; and
   passing the polarized light from the Faraday rotator material through the output polarizer so as to prevent reflected light from transmission through the input polarizer due to a non-reciprocal rotation of the light in the second direction through the Faraday rotator material so as to allow the input polarizer to block the reflected light.

* * * * *